Patented Nov. 18, 1930

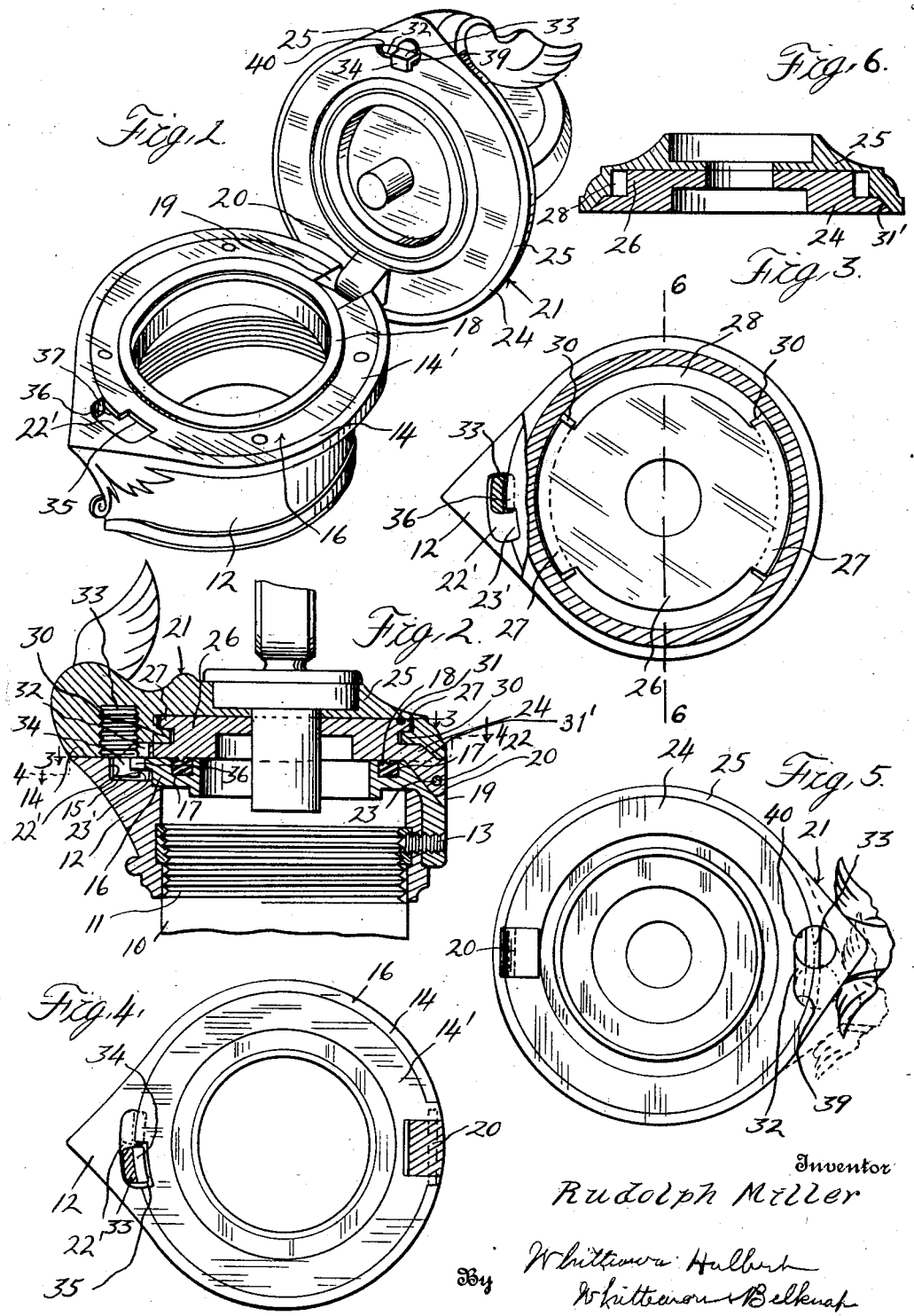

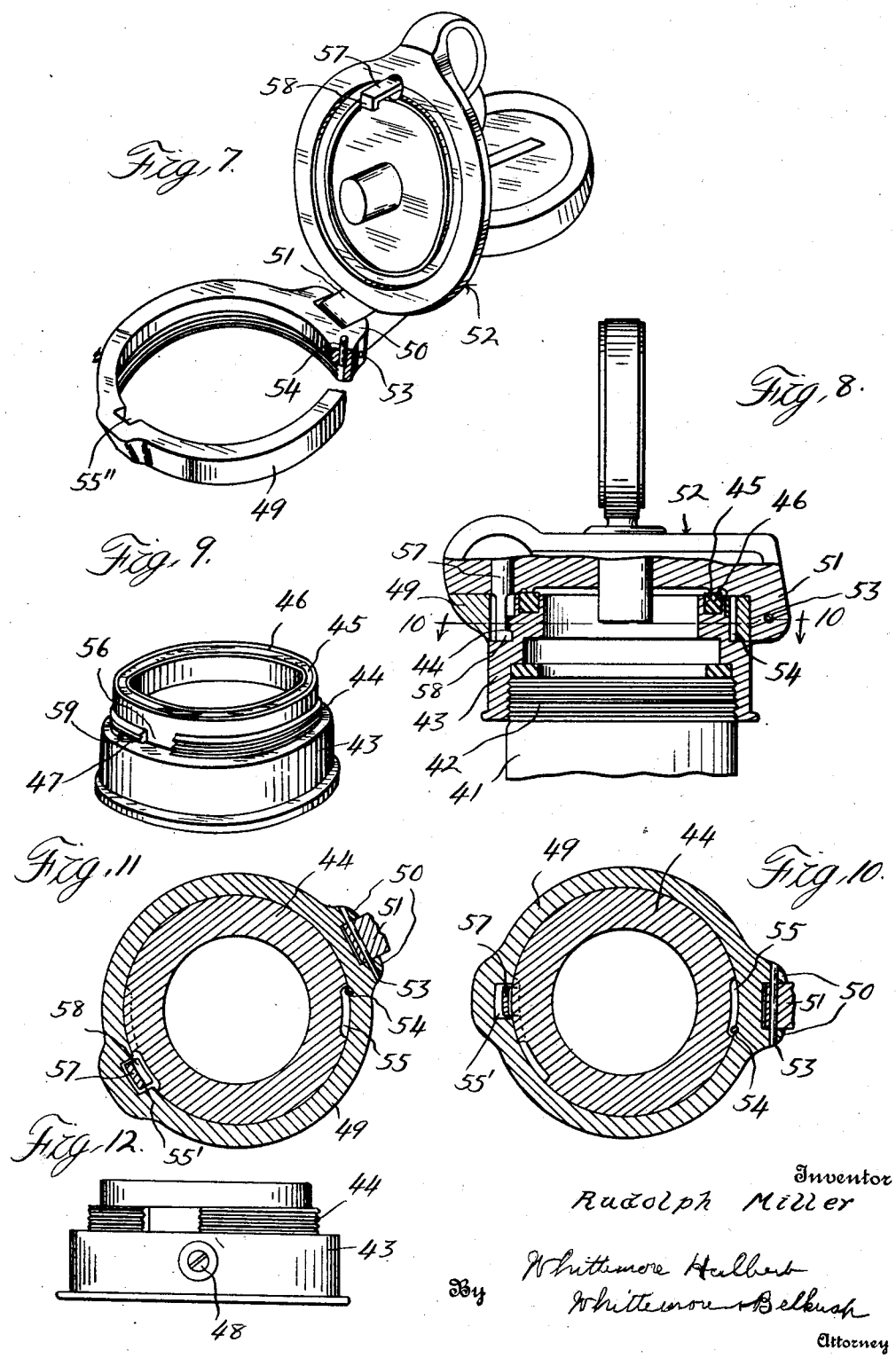

1,781,878

UNITED STATES PATENT OFFICE

RUDOLPH MILLER, OF DETROIT, MICHIGAN, ASSIGNOR, BY MESNE ASSIGNMENTS, TO BOHN ALUMINUM & BRASS CORPORATION, OF DETROIT, MICHIGAN, A CORPORATION OF MICHIGAN

RADIATOR-CAP CONSTRUCTION

Application filed December 12, 1927. Serial No. 239,569.

The invention relates to closures and more particularly to closures for the filler tubes of automobile radiators.

The invention has as one of its primary objects, to provide a closure of the above type distinguished by its simplicity of construction and facility with which it may be operated to open or close the filler tube which not only enhances its value, both mechanically and commercially but provides a design of a strong and durable nature.

While the invention is applicable to containers adapted for many different uses, nevertheless, the invention finds particular utility in connection with the filler tubes of automobile radiators. Heretofore it has been quite generally the practice to threadedly secure the closure upon the filler tube. This arrangement is objectionable not only from the standpoint of the time required to attach and detach the closure, but also due to the difficulty in accurately aligning the closure with respect to the radiator.

It is therefore one of the objects of this invention to eliminate the disadvantages heretofore pointed out and to provide a closure permanently attached to the filler tube and one that will present a sightly and finished appearance. The several details of construction of this invention will be made more apparent as this description proceeds especially when considered in connection with the accompanying drawings wherein Figure 1 is a perspective view of the closure showing the same in open position;

Figure 2 is a sectional view of the closure showing the same in latched position;

Figure 3 is a sectional view taken in the plane indicated by the line 3—3 of Figure 2;

Figure 4 is a sectional view taken on the plane indicated by the line 4—4 of Figure 2;

Figure 5 is a bottom plan view showing the closure member in latched and unlatched positions;

Figure 6 is a sectional view taken on the plane indicated by the line 6—6 of Figure 3;

Figure 7 is a perspective view of a modified form of closure;

Figure 8 is a sectional view of the closure showing the same applied to a filler tube of an automobile radiator;

Figure 9 is a perspective view of the adapter ring;

Figure 10 is a sectional view taken substantially on the line 10—10 of Figure 8;

Figure 11 is a view similar to Figure 10 showing the closure turned to unlatched position; and Figure 12 is a detail view showing the adapter ring.

In the present instance, I have shown a filler tube 10 of an automobile radiator having a threaded portion 11 for receiving a ring 12 which, as shown is permanently secured to the filler tube by means of the set screw 13. The upper surface 14 of the ring 12 is formed with a circumferentially extending recess 15 for receiving an annular ring 16 which as shown is permanently secured to the base of the recess by flush riveting. The upper surface 14' of the ring 16 being flush with the surface 14 of the ring 12. Formed adjacent the inner edge of the ring 16 is a circumferentially extending groove 17 for receiving a compressible gasket 18. The ring 16 is further cut away as indicated at 19 for receiving the depending hinge member 20 formed upon the closure member 21. This hinge member being apertured as at 22 for receiving a pin 23 which engages in aligned apertures formed in the opposite side walls of the cut away portion 19 for accomplishing a hinge function of the closure 21. The recess 15, diametrically opposite the hinge connection aforesaid, is formed with an extension or slot 22' which projects beyond the periphery of the ring 16 and communicates with a slot 23' formed in the inner surface of the ring 16.

The closure member 21 is formed of two parts, a non-rotatable part 24 upon which the hinge member 20 is formed and a relatively rotatable part 25 constituting the top of the closure 21. The part 24 is provided with an upwardly extending annular projection 26 having diametrically opposite arcuate lateral projections 27 in substantial alignment with the pivotal connection of the part 24 with the ring 12. The rotatable part 25 on the other hand is formed with a recess 28 of sufficient diameter to receive the projection 26. The recess 28 is provided with the diametrically opposite inwardly extending projections 30 which together with the inner surface 31 of the part 25 constitute grooves for receiving the projections 27 upon the part 24. Thus when assembling the part 25 upon the part 24, the projections 27 on the latter are inserted in the recess 28 between the projections 30 thereof. The part 25 is then merely rotated a quarter of a turn or through an arc of approximately 90°, at which time the projections 27 will engage behind the projections 30 on the part 25 and the latter is in its proper assembled position with the stationary part 24. It will further be noted that the recess 28 completely encases the part 24 and is provided with a portion 31' inclined with respect to the longitudinal axis of the cap constituting an efficient bearing for the periphery of the part 24, which as shown is also inclined to accurately engage the inclined portion aforesaid. In order to limit the rotation of the part 25 about the part 24 so that the former cannot normally be rotated to the extent that it may be detached from the part 24, I provide an elongated slot 32 in the periphery of the part 24 in substantial alignment with the projections 27 and arranged to register with the extension 22' of the recess 15 in the closed position of the parts. Threadedly engaging the part 25 and extending into the slot 32 is a plug 33 having a hooked portion 34 upon the lower end thereof arranged to extend through a slot 35 formed in the periphery of the ring 16. As shown the dimension of the slot 35 is such that one end 36 thereof extends into the portion 22' of the recess 15 and by reason of the slot 23' formed in the inner surface of the ring 16, is spaced above the bottom of the recess 15, thus forming a projection or shoulder for engagement with the hooked portion 34 of the plug upon rotation of the part 25. The extent of rotation of the part 25 depending upon the length of the slot 32 and the dimension thereof is so selected that when the plug 33 engages the side wall 39 of the slot, the hooked portion is out of engagement with the ring 16 and the closure is free to be swung to open position, while on the other hand when the plug is in engagement with the opposite wall 40 of the slot, the closure is locked in closed position. Thus assuming that the closure is swung to open position and it is desired to close the same the part 25 is rotated until the plug 33 contacts with the side wall 39 of the slot 32. The closure is then swung to closed position at which time the hooked portion 34 of the plug will project through the slot 35 and into the extension 22 of the recess 15. The part 25 is then rotated until the hooked portion firmly engages the inner surface of the wall 36 of the slot 35.

In the modified form of the invention illustrated in Figures 7 to 12 inclusive, it will be noted that there is illustrated a filler tube 41 of an automobile radiator having a threaded portion 42. Threadedly mounted upon the filler tube is a ring 43 having a reduced threaded portion 44 at its upper end formed with an annular recess 45 for receiving a gasket 46 and further formed with a bayonet slot 47 in the side thereof. To prevent any escape or removal of the ring from its described position upon the filler tube and to accurately position the former with respect to the latter, it is preferred to establish an engagement between the ring and tube supplemental to their threaded connection. This may be accomplished in any suitable manner herein shown as by means of a set screw 48 threadedly engaging the ring and abutting the filler tube. Thus from the foregoing, it will be readily apparent that after the ring has assumed its predetermined position it is permanently secured to the filler tube by means of the set screw 48. Threadedly mounted upon the ring 43 is a second ring 49 having the laterally projecting ears 50 spaced apart a sufficient distance to receive the lug 51 depending from the closure member 52. A suitable pin 53 is then placed in aligned apertures formed in the ears 50 and lug 51 for effecting a hinge function of the closure. To restrict the movement of the ring 49, relative to the ring 43 the former is provided with a depending projection or pin 54 of a sufficient length to engage in an elongated recess 55 formed in the side of the ring 43. Thus it will be noted that while the ring 49 is permanently secured to the ring 43, it is capable of a slight rotative movement relative thereto. The ring 49 is further provided diametrically opposite the hinge connection aforesaid with a slot 55' registerable in one position of the ring 49 with the open portion 56 of the bayonet slot 47 formed in the ring 43. For rigidly securing the closure member 52 upon the rings, the former is provided with a depending projection 57 having a laterally offset hooked portion 58 at the lower end thereof. The position of the projection 57 upon the closure is so selected that it will register with the slot 55' formed in the ring 49 and with the open portion 56 of the slot 47, in one rotative position of the ring 49. The hooked portion 58 being so arranged as to engage the upper wall 59 of the slot 47 which as shown, is slightly inclined downwardly so that upon rotation of the ring 49 and closure member, the latter will be subjected to a sealing pressure upon the gasket 46.

While it is believed that the operation of the device will be thoroughly understood from the foregoing description a brief outline thereof will be given. Assuming that the closure is swung to open position and it is desired to close the same, the operator merely swings the closure downwardly about its pivot, the projection 57 extending through the slot 55' and into the bayonet slot 47. The ring 49 together with the closure 52 is then rotated until the hooked portion 58 of the projection firmly engages the upper inclined wall 59 of the slot 47. To open the closure, the latter is merely rotated in a direction opposite to the direction aforesaid until the pin 54 engages one side of the recess 55 at which time the openings 55' and 56 register, permitting the closure to be swung to open position.

Thus from the foregoing, it will be readily apparent that a device of the character herein shown and described offers the possibility of eliminating complicated and inefficient connections between the filler tube and closure therefor, and renders possible the production of a commercially satisfactory construction which can be cheaply and durably manufactured, assembled and installed.

What I claim as my invention is:

1. The combination with a filler tube of a radiator, of a ring secured to said filler tube having a recess therein, a member positioned within said recess, a closure having a part hingedly mounted upon said ring and another part rotatably mounted upon said first mentioned part, and means upon said rotatable part engageable in a portion of said recess in one rotative position of said rotatable part and engageable with said member in another rotative position thereof to subject the closure to a sealing pressure upon said ring.

2. The combination with a filler tube of a radiator, of a ring secured to said filler tube having a recess therein, a member arranged within said recess having a groove therein for receiving a gasket, a closure having a part hingedly mounted upon said ring and another part rotatably mounted upon the part aforesaid, and means depending from said rotatable part engageable in one rotative position of the latter with said recess and operable in another rotative position to subject the closure to a sealing pressure upon said gasket.

3. In a device of the class described a closure having relatively rotatable parts, one part completely encasing and detachably engaging the other part, and means for limiting the relative rotation of said parts to normally prevent displacement thereof.

4. In a device of the class described, a closure including two parts, one part having a recess therein for receiving the other part, and means projecting from the first mentioned part into said recess and engageable with said second part for detachably securing said parts together and for permitting a relative rotation of one of said parts.

5. In a device of the class described, a closure including a part having a recess therein, a second part closing said recess and arranged flush with the bottom of said first part, means arranged within said recess and engageable with said second part for holding the same in engagement with said first mentioned part, said means being operable upon relative rotation of said parts to disengage the same, and means operable to permit a limited relative rotation of said parts but to normally prevent rotation thereof to the extent that said parts become disengaged.

6. In a device of the class described, a closure including two relatively movable parts, one part encasing the other and having a member projecting therefrom engageable in an elongated slot formed in the other of said parts for limiting the relative rotation of said parts.

7. In a device of the class described, a closure including a part formed with laterally projecting portions, a second part having a recess therein for receiving the part aforesaid and formed with inwardly projecting portions engageable with the lateral projections aforesaid for holding said parts in assembled position.

8. In a device of the class described, a closure including a part having an upwardly extending projection formed with diametrically opposite lateral projections, a second part recessed for receiving said first part, and projections extending inwardly from the sides of said recess and engageable with the said lateral projections for normally holding the said parts in assembled position.

9. In a device of the class described, a ring, a closure having a part hingedly mounted upon said ring, a second part encasing the part aforesaid and capable of rotation relative thereto, a member projecting from the second part and engageable with the first part to limit the relative rotation of said parts, said member also being operable in one rotative position of the parts to engage said ring and subject the closure to a sealing pressure upon said ring.

10. The combination with a container having an opening therein, and a ring surrounding said opening having a shoulder, of a closure member normally seated upon said ring and having relatively movable interlocking parts, and means upon said closure operable upon relative movement of said parts to engage the shoulder aforesaid and subject the closure to a sealing pressure upon the ring.

11. The combination with a container having an opening therein and a ring surrounding said opening, of a closure member normally seated upon said ring and formed of relatively movable interlocking parts, one of said parts being hingedly connected to the ring, and means upon the closure operable upon relative movement of said parts in one direction to permit the closure to function about the hinge connection aforesaid and operable upon relative movement of the parts in another direction to subject the closure to a sealing pressure upon the ring.

12. The combination with a container having an opening therein, of a closure for said opening composed of relatively movable parts, one part hingedly connected to the container and another part completely encasing the part aforesaid and means upon both of said parts cooperating to form an interlocking connection therebetween.

13. The combination with a container having an opening therein of a closure for said opening formed of relatively movable parts and means projecting from one of said parts operable to limit relative movement thereof and to subject the closure to a sealing pressure upon the container.

14. A closure for containers having relatively moving parts, and means associated with said parts forming a detachable interlocking connection therebetween, said means operable upon a predetermined relative movement of the parts to disengage the same from each other.

15. A closure for containers having relatively movable parts, means associated with said parts forming a detachable interlocking connection therebetween, said means operable upon a predetermined relative movement of the parts to disengage the same from each other, and means detachably carried by one of said parts and engageable with another part for normally restricting relative movement of the parts.

In testimony whereof I affix my signature.

RUDOLPH MILLER.